United States Patent [19]

Haafkens et al.

[11] 4,245,702
[45] Jan. 20, 1981

[54] METHOD FOR FORMING CHANNELS OF HIGH FLUID CONDUCTIVITY IN HARD ACID-SOLUBLE FORMATIONS

[75] Inventors: Rudolf Haafkens; Rafael F. Luque; Willem De Vries, all of Rijswijk, Netherlands

[73] Assignee: Shell Internationale Research Maatschappij B.V., Netherlands

[21] Appl. No.: 36,675

[22] Filed: May 7, 1979

[30] Foreign Application Priority Data

May 22, 1978 [GB] United Kingdom ............... 21052/78

[51] Int. Cl.³ ............................................. E21B 43/27
[52] U.S. Cl. .................................. 166/307; 166/280; 166/308
[58] Field of Search ............... 166/271, 273, 274, 280, 166/281, 307, 308

[56] References Cited

U.S. PATENT DOCUMENTS

| | | | |
|---|---|---|---|
| 2,664,165 | 12/1953 | Bond | 166/308 |
| 3,167,124 | 1/1965 | Graham | 166/308 X |
| 3,455,388 | 7/1969 | Huitt | 166/308 X |
| 3,592,266 | 7/1971 | Tinsley | 166/308 X |
| 3,768,564 | 10/1973 | Knox et al. | 166/308 X |
| 3,842,911 | 10/1974 | Knox et al. | 166/308 X |
| 3,918,524 | 11/1975 | Broaddus | 166/308 X |
| 3,954,142 | 5/1976 | Broaddus et al. | 166/308 X |
| 4,078,609 | 3/1978 | Pavlich | 166/308 X |

Primary Examiner—James A. Leppink
Assistant Examiner—George A. Suchfield
Attorney, Agent, or Firm—Pravel, Gambrell, Hewitt, Kirk, Kimball & Dodge

[57] ABSTRACT

A fracturing and acidization method for increasing the productivity of relatively hard acid-soluble formations about a perforated well, comprising the steps of producing a formation fracture containing a viscous fluid and propping agent; injecting an acid solution having a viscosity value fifty times less than the contained viscous fluid into the fluid filled fracture, thereby forming etched channels in the fracture walls and displacing the propping agent from such channels; and lowering the fluid pressure in the fracture to allow the walls thereof to become displaced towards a closing position until held open by the propping agent. Channels so formed have a greater width than can be formed by conventional techniques and consequently substantially increase the productivity of such formations.

8 Claims, 5 Drawing Figures

METHOD FOR FORMING CHANNELS OF HIGH FLUID CONDUCTIVITY IN HARD ACID-SOLUBLE FORMATIONS

BACKGROUND OF THE INVENTION

The invention relates to a method for forming channels of high fluid conductivity in formation parts around a borehole penetrating such formation. In particular, the present invention relates to a method for creating channels of high fluid conductivity in relatively hard, acid-soluble formations.

The majority of the known techniques designed for increasing the productivity of formations surrounding a borehole apply a combination of formation fracturing and acid treatment. A propping agent may optionally be added for further increasing the productivity.

A large variety of these techniques are known. In the British Pat. specification No. 672,789, a method is described wherein the formation is fractured by injecting a viscous fracturing medium which, optionally, has a propping agent added thereto. Subsequently, an acid solution may be injected into the fracture to reduce the viscosity of the fracturing medium and to react with the formation.

U.S. Pat. No. 2,689,009 mentions the injection, at fracturing pressure, of a viscous emulsion of an acid and an oily vehicle, which emulsion carries a propping agent followed by the injection of a plain acid for breaking the emulsion and reacting with the formation.

U.S. Pat. No. 3,044,549 describes the injection of a mixture of oil, acid and propping agent at fracturing pressure into an oil-containing formation.

U.S. Pat. Nos. 3,285,340 and 3,481,401 both mention fracturing by means of a viscous medium, followed by the passage of a propping agent into the fracture. Subsequently, the fracture is closed and acid is injected through the fracture containing the propping agent. The agent is either deformable and acid-resistent, or permeable and filled with a surfactant. The agent locally protects the fracture wall against attack by the acid, as a result of which pillars are created in the fracture walls wherein the walls are contacted by the propping agent.

U.S. Pat. No. 3,642,068 describes the creation of a fracture by means of a viscous medium followed by the passage of propping agents into the fracture. The agent is shifted to a remote location in the fracture by means of an acid that etches those parts of the fracture walls which are close to the borehole. Subsequently the fracture is closed.

U.S. Pat. No. 3,842,068 describes the formation of a fracture and the introduction of propping agent into the fracture, followed by the complete closure of the fracture on the propping agent and the injection of acid under conditions at which the fracture remains closed.

Finally, U.S. Pat. No. 3,768,564 mentions the formation of a fracture without using a propping agent, acidizing the open fracture, and continuing said acidization after the fracture has been closed.

Although good results may be obtained by the majority of the above-referred techniques, it is often desirable in oil recovery processes to increase the productivity of a hard, acid soluble formation to a greater extent than is obtainable by the above described techniques.

SUMMARY OF THE INVENTION

An objective of the present invention is to increase the productivity gain that can be obtained by formation treatments designed for increasing productivity in a relatively hard, acid-soluble formation by a unique combination of fracturing and acidizing of the formation parts in the vicinity of a production well.

By way of example, the invention may be carried out with the following steps;

(1) installing a casing in the well, and introducing in the wall of the casing a plurality of perforations arranged over at least part of said well casing which faces the formation;

(2) producing in the formation a fracture containing a viscous fluid and a propping agent which communicates with the perforations while the fluid pressure is maintained at a point at which the fracture is kept open;

(3) injecting an aqueous acid solution through the perforations into the fracture at a pressure at which the fracture remains open, the viscosity ratio between the viscous fluid and the acid solution being chosen such that the viscous fluid is displaced in the fracture in an unstable or irregular manner by the acid solution;

(4) continuing the injection of the acid solution through the perforations until channels have been etched in areas of the fracture walls that face each other;

(5) lowering the fluid pressure in the fracture, thereby allowing the fracture walls to become displaced towards each other; and (6) lowering the viscosity of the viscous fluid.

BRIEF DESCRIPTION OF THE DRAWINGS

The invention will be described in more detail by way of example with reference to the drawing, wherein.

DETAILED DESCRIPTION OF THE PREFERRED EMBODIMENTS

Figure 1:
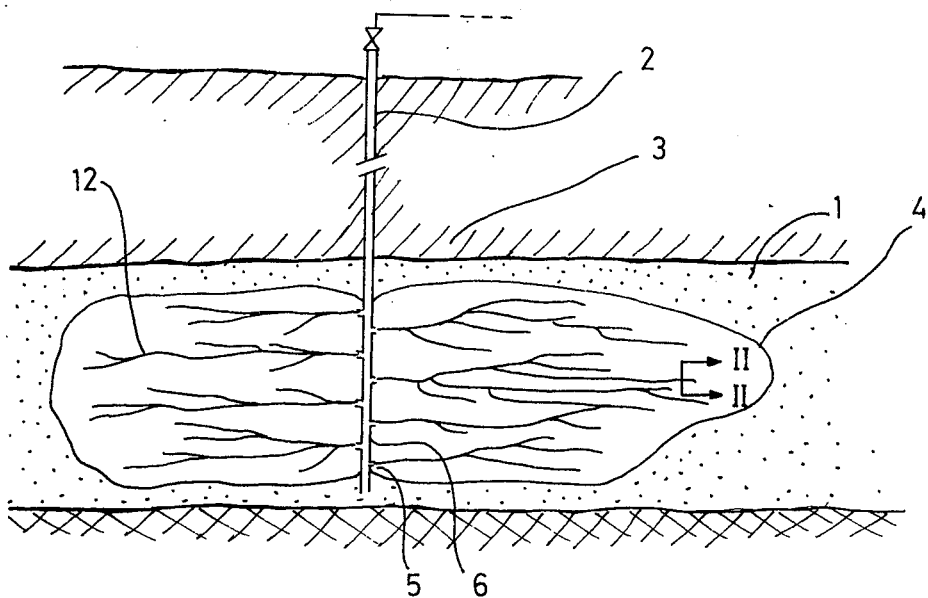
FIG. 1 shows schematically a vertical section across a borehole penetrating a subsurface formation.

The formation 1 shown in FIG. 1 of the drawing is a limestone formation containing hydrocarbons in the pore space thereof, which hydrocarbons are to be produced via the borehole or well 2 which penetrates through an overlying formation 3 and the limestone the formation 1. The well 2 is completed with equipment that is normally used for that purpose. Therefore, no details thereof are shown in the drawing.

To increase the productivity of the limestone formation 1 by the method according to the invention, a vertical fracture 4 is first formed in the formation around the well 2 by injecting a fracturing fluid into the formation. This fluid is passed from the interior of the well 2 into the pore space of the formation 1 via perforations 5 that have been shot in the casing 6 of the well 2. The fluid is injected at a pressure that is sufficiently high to fracture the formation.

Any type of fracturing fluid, either viscous or nonviscous, which is suitable for fracturing the formation 1 may be used for this purpose. Examples of viscous fluids are gelled water, hydrocarbon-in-water emulsions, water-in-hydrocarbon emulsions, and gelled hydrocarbons. A viscosity breaker may be added to the viscous fracturing fluid, which breaks the viscosity of the fracturing fluid after a predetermined time interval, either under influence of the temperature prevailing in the fractured formation, or by a retarded chemical reaction, or by any other mechanism. Such viscosity breakers are known per se, and need not be described in detail. The same applies for the composition of the fracturing fluid, the viscosifying agents and the fluid loss preventing agents that are optionally incorporated therein, and the injection pressures that have to be used for inducing a fracture.

The fracture 4, after being induced, is kept open by maintaining a sufficiently high pressure on the fracturing fluid. The walls 7 and 8 of the fracture 4 (see FIG. 2 that shows an enlarged detail of section II—II of FIG. 1) are thus kept at a distance of several millimeters from one another, and the space between the walls contains the fracturing fluid 9.

Subsequently, the fracturing fluid 9 is displaced from the fracture 4 by injecting a viscous carrying medium 10 carrying propping agent 11 down the well 2, through the perforations 5 and into the fracture 4. The viscosity of the carrying fluid is chosen to be equal to or higher than the viscosity of the fracturing fluid, and is at least sufficient to transport the propping agent 11 into the fracture 4. As a result thereof, a stable or uniform displacement of the fracturing fluid 9 occurs as the carrying fluid 10 is injected. On continued injection of the carrying fluid 10, the fracture becomes filled with this fluid over the total height thereof (see FIG. 3). Since a propping agent 11 is incorporated in the carrying fluid 10, the fracture 4 will also be filled with propping agent over substantially the full height thereof. Injection of the carrying fluid with propping agent is contained until a dense packing of propping agent 11 is obtained in the fracture 4. It will be appreciated that the carrying fluid may be of the same composition as the fracturing fluid.

Propping agents suitable for use in the method of the present invention are granular particles, such as silica sand. However, the invention is not restricted to the use of such sand, since any other propping agent having dimensions that allow the agent to be introduced into the fracture 4 and which are resistant against the fluids and pressures prevailing in said fracture, may be used as well. Examples of other such suitable propping agents are glass beads, granular particles of minerals, crushed coke particles, crushed shells, and crushed nuts such as walnuts or coconuts.

Subsequently, an acid solution is pumped down the well under a pressure at which the solution will enter the fracture 4 and keep the walls thereof at such a distance from each other that the propping agent is not compacted thereby. The solution enters this fracture through the perforations 5 in the casing 6, which perforations are distributed over that part of the casing 6 that faces the oil-producing part of the formation 1. By a suitable choice of the composition of the carrying fluid 10, the original viscosity thereof is substantially maintained at least during that the period of time in which the acid solution is being injected into the fracture that contains the viscous carrying fluid 10 with the propping agent 11. The acid is injected at a pressure sufficiently high to prevent the closure of the fracture 4.

The viscosity ratio between the viscous carrying fluid 10 and the acid solution is chosen such that the displacement of the carrying fluid in the fracture by the acid solution that is being introduced into the fracture is unstable or irregular. By unstable or irregular displacement is meant that the carrying fluid and the propping agent contained therein will only be partially displaced. Because of the viscosity difference between the injected acid solution and the contained carrying fluid, the acid will move through and displace only part of the more viscous fluid, the unstable displacement occuring as small cross-sectional area pathways or channels. Such unstable displacement results in a so called "fingering" of the acid solution through the viscous mass of carrying fluid. Such unstable displacement is reached at relatively low values of the ratio between the carrying fluid viscosity/acid solution viscosity (viscosity ratio), such as in the order of 50. To keep the cross-sectional areas of the flow paths of the acid sufficiently small so as to promote a desirable extension of these flow paths in the fracture in a lateral sense with respect to the well, this viscosity ratio may be increased to a value of 150 or thereabove. An excellent fingering displacement will be reached at a viscosity ratio between 200 and 300. The viscosity ratio is measured at the conditions prevailing in the fracture.

It will be appreciated that the use of a plurality of perforations 5 in the vertical casing 6 and arranged at vertically spaced levels over the casing part facing the oil-containing formation 1, results in a plurality of fingering flow paths 12 of the acid through the viscous carrying fluid, which flow paths are substantially evenly distributed over the height of the fracture 4.

Figures 2, 3, 4, 5:
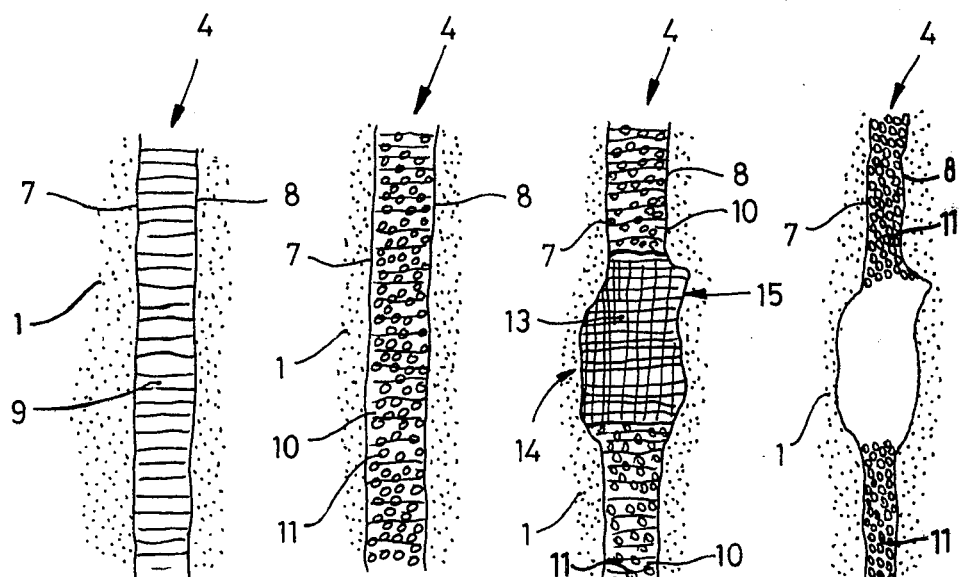
FIG. 2 shows on a larger scale than FIG. 1, the section II—II across the fracture formed in the formation.
FIG. 3 shows the section of FIG. 2 when propping agent has been introduced into the fracture.
FIG. 4 shows the section of FIG. 3 as an acid is injected into the fracture and a channel system is etched in the fracture walls.
FIG. 5 shows the section of FIG. 4, after the fluid pressure in fracture has been released.

The fingering paths 12 followed by the acid solution and originating from the perforations 5 form the base of a channel system that will be etched in the walls 7 and 8 of the fracture 4 by the action of the acid solution on the material of the walls during continued injection of the acid into the fracture 4. FIG. 4 shows the section of FIG. 3 as the acid solution 13 is passed therethrough. The path of the acid solution is bounded by the fracture walls 7 and 8 and by the viscous carrying medium 10 present in the fracture. Channels 14 and 15 are etched in the walls 7 and 8, respectively, by a chemical reaction which takes place between the acid solution and the limestone rock of formation 1. At least part of the propping agent present in the flow paths of the acid solution may be displaced from these paths by the displacement of the carrying fluid 10 at those locations.

It will be appreciated that a large variety of acids, either inorganic or organic, are available which are capable of etching the particular formation that is to be treated by the method of the invention. For etching a limestone formation, use may be made of aqueous solution of hydrochloric acid, acetic acid, formic acid or mixtures thereof. Retarders may be added to such solutions if considered necessary. To protect the equipment in the borehole of well 2, it is often advisable to add corrosion inhibitors to the solution. In an alternative manner, solutions may be used wherein the acid is formed in situ in the formation by means of a retarded chemical reaction. Such solutions are known per se and do not require any detailed description.

After the channels 14 and 15 have been etched to an appreciable depth in the walls 7 and 8, respectively, the injection of acid into the fracture 4 is stopped, and the fluid pressure in the fracture 4 is allowed to decrease. This results in the fracture walls 7 and 8 being displaced towards each other under the influence of the formation pressure thereby loading and compacting the propping agent 11 between the non-etched areas of the walls.

Simultaneous with the pressure decrease in the fracture or some time later, the viscosity of the carrying fluid 10 is allowed to break down. Viscosity breakdown will occur automatically after a predetermined time interval, and may take place under the influence of the formation temperature, by retarded chemical action, or by any other suitable viscosity breaking agent with delayed action.

Since the formation rock is relatively hard, the propping agent 11 that is caught between the non-etched areas of the closing walls 7 and 8, will be compacted between these walls, but will not be embedded therein. Consequently, the fracture walls 7 and 8 remain at a certain distance from each other after the fluid pressure in the fracture has been allowed to drop. As a result thereof, the width of the channels 14 and 15 is equal to the sum of the depths of these channels plus by the width of the fracture 4 after closing. Since the productivity of the channels is roughly proportional to the third power of the width thereof, it will be appreciated that the productivity of the channels 14 and 15 in FIG. 5 is increased considerably as compared to the productivity of channels etched to the same depth in the walls of a fracture which has no propping agent therein to hold open the non-etched part of the fracture upon fracture closure after the acidizing operation.

Finally, it is observed that the channels 14 and 15 contain only a small amount of propping agent, if any, which agent may be displaced therefrom by oil flowing therethrough to the well. Since the formation material is relatively hard, say a Brinell hardness over 15, the walls of the channels, as well as the walls of the non-etched part of the fracture will not collapse during the recovery of oil from the formation.

It is observed that equipment for measuring Brinell hardness has been described by A. C. van der Vlis in the lexture "Rock classification by a simple hardness test" presented on the Second Congress of the International Society of Rock Mechanics (September 1970).

The invention relates to the formation of a fluid channel system with relatively high conductivity in a formation consisting of a relatively hard material that is substantially soluble in acid, wherein the channels of a channel system formed in the walls of a fracture by acid-action are substantially free from propping agent, the walls of the channels are self-supporting, and propping agent is present in the areas of the wall portions of the fracture that are situated between the channels of the channel system. Such fracture remains open after the fluid pressure in the fracture has been released, which considerably increases the productivity of the channels.

In the embodiment described above, the propping agent 11 has been supplied to the fracture 4 after this fracture has been formed. However, in an alternative embodiment, the propping agent may be supplied directly to a viscous fracturing medium and thus be introduced into the fracture during the formation thereof.

The invention is not restricted to the use of any particular composition of fracturing fluid, aqueous acid solution, carrying fluid or propping agent, as long as the viscosity ratio between the carrying fluid 10 and the acid solution 13 is chosen such that the carrying fluid is displaced by the acid solution in an unstable manner whereby fingering of the acid solution through the carrying fluid occurs. Most remarkable results will be obtained by application of the invention in limestone formations, although there are other types of acid-soluble formations of relatively hard rock wherein the present method may be used with advantage.

Buffer fluids may be injected into the formation to be treated by the present method, such buffer fluids being injected between the fracturing fluid, the carrying fluid and the acid solution. If further desired, pre-treatment fluids may be injected prior to the injection of the fracturing fluid.

The viscous fracturing fluids and the viscous carrying fluids that may be used in the present method preferably do not contain acid components in amounts that are suitable for etching appreciable parts of the walls of the fracture. Relatively small amounts of acids, however, may be present, such as required for breaking the viscosity of the fluid after a predetermined period when the fluid pressure in the fracture has been released.

It will be appreciated that notwithstanding all measures that are being taken to obtain an equal distribution of the acid solution over all the perforations, there may be one or more perforations that have a relatively high conductivity compared to the other perforations which will thus take the bulk volume of the acid solution that is being injected. In such case, a slug of fluid comprising a diverting agent is injected after the walls of the fracture part facing such high-conductivity perforations have been etched to an appreciable depth. The agent then closes off the entry to these perforations and the acid solution that is subsequently injected down the well will then pass through the remaining perforations. If desired, this procedure may be repeated more than once. Diverting agents, as well as the ways for placing the same in, and removing them from the perforations are known per se, and do not need to be described in detail.

The method of the present invention may also be applied in wells that deviate from the vertical and/or in wells that penetrate formations that fracture horizontally.

If the well should deviate from the vertical over the height of the formation to be fractured and be situated in the plane of the fracture, the direction of the minimum tectonic stress in the formation is ascertained, and the well is directionally drilled such that the axis thereof is non-vertical, but in a plane orthogonal to the said stress direction. On fracturing the formation, the well will then be in the plane of the fracture. Since the majority of formations have the direction of the minimum tectonic stress in a horizontal plane, the fracture plane will be arranged vertically in most cases. However, the present method may be applied with equal good results in formations that fracture horizontally.

To ascertain the direction of the minimum tectonic stress, the formation may be fractured by supplying pressurized fracturing fluid to an uncased borehole in the formation. The orientation of the fracture thus formed, is subsequently measured with respect to the hole. The hole may then be side-tracked at a level above the oil-containing formation, whereafter the lower part of this hole is redrilled by directional drilling in a manner such that the axis of the redrilled part of the well that passes through the oil-containing formation extends in a plane parallel to the plane of the said fracture. After casing the borehole and perforating the casing, the formation may be fractured by supplying a pressurized fracturing fluid to the hole. The borehole will then be in the plane of the fracture.

It is observed that if the well is arranged to be fractured in a plane orthogonal to the direction of the minimum tectonic stress, the perforations need not necessarily be arranged in this plane. Irrespective of the orientation of the perforations arranged in the wall of the casing, the formation will then be fractured such that the well lies in the plane of the fracture.

Although the invention has been described in terms of its preferred embodiments, those of ordinary skill in the art may make modifications and changes therein without departing from the scope or spirit of the invention as described above and claimed hereafter.

We claim:

1. A method for forming channels of high fluid conductivity in relatively hard acid-soluble formation parts around a cased well which has its casing perforated along at least a part of the casing wall which faces such formation, said method comprising the steps of:
   (a) producing in the formation a fracture containing a viscous fluid with propping agent and maintaining a fluid pressure at which the fracture is kept open;
   (b) injecting an acid solution through the perforations into the fracture at a pressure at which the fracture remains open, the viscosity ratio between the viscous fluid and the acid solution being chosen such that the viscous fluid is displaced in the fracture in an unstable manner by the acid solution;
   (c) continuing the injection of the acid solution through the perforations until channels have been etched in areas of the fracture walls that face each other; and
   (d) lowering the fluid pressure in the fracture, thereby allowing the adjacent fracture walls to be displaced towards each other until a portion of the non-etched parts of the walls are supported by the propping agent.

2. The method of claim 1, including the step of lowering the viscosity of the viscous fluid.

3. The method according to claim 2, wherein the fluid pressure and fluid viscosity are lowered simultaneously.

4. The method according to claim 1 or 2, wherein the viscosity ratio between the carrying fluid and the acid solution is at least 150.

5. The method according to claim 4, wherein the viscosity ratio is between 200 and 300.

6. The method according to claim 1, wherein the formation substantially consists of limestone.

7. The method according to claim 1, wherein the relatively hard formation consists of a material having a Brinell hardness higher than 15.

8. The method according to claim 1, wherein the well lies in the plane of the fracture.

* * * * *